United States Patent [19]

Butterworth, deceased et al.

[11] 3,835,651

[45] Sept. 17, 1974

[54] LITTORAL FLOW TRAP OR BASIN

[75] Inventors: Arthur B. Butterworth, deceased, late of Smithfield, Va.; Roland A. McCoy, executor, Hampton, Va.

[73] Assignee: Helen Libbey Butterworth, Smithfield, Va.

[22] Filed: Oct. 27, 1972

[21] Appl. No.: 301,514

[52] U.S. Cl. .................................................. 61/4
[51] Int. Cl. ............................................. E02b 3/06
[58] Field of Search ................. 61/6, 3, 4, 2, 37, 47

[56] References Cited
UNITED STATES PATENTS

| | | | |
|---|---|---|---|
| 456,749 | 7/1891 | Wurts | 61/4 X |
| 1,274,450 | 8/1918 | Remington | 61/4 |
| 1,721,893 | 7/1929 | Zizinia | 61/4 |
| 1,877,113 | 9/1932 | Young | 61/4 X |
| 1,880,838 | 10/1932 | Curney | 61/3 |
| 2,099,249 | 11/1937 | Wood | 61/4 |
| 3,214,916 | 11/1965 | Martin | 61/4 |
| 3,426,536 | 2/1969 | Danz | 61/3 |

OTHER PUBLICATIONS

Popular Mechanics, June 1960, page 62 "T-Shaped Wall Traps Sand to Build Beaches".

*Primary Examiner*—Robert R. Mackey
*Assistant Examiner*—Philip C. Kannan
*Attorney, Agent, or Firm*—Watson, Cole, Grindle & Watson

[57] ABSTRACT

A littoral flow trap or basin designed to effect the build-up of a beach and to prevent future erosion, including interconnecting inshore and offshore bulkheads open to the littoral flow direction for trapping gravel material and the like therewithin.

5 Claims, 6 Drawing Figures

PATENTED SEP 17 1974 3,835,651

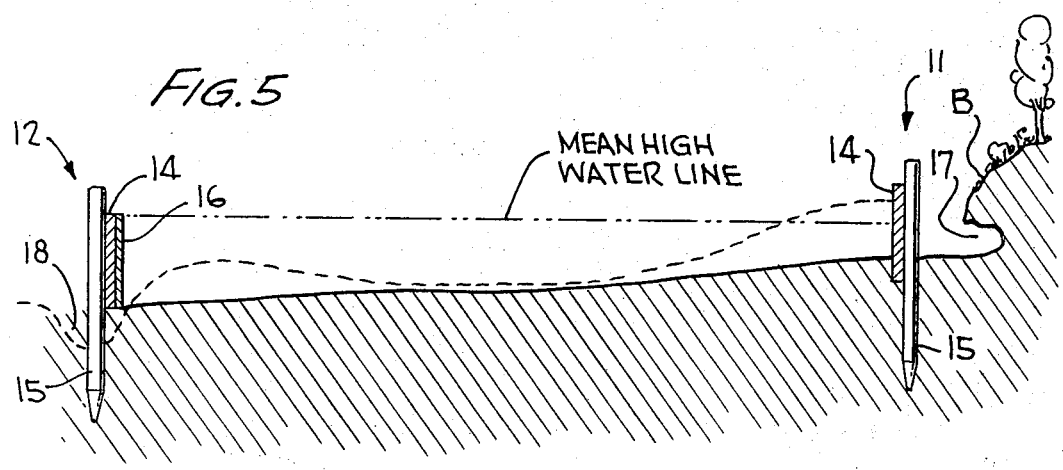
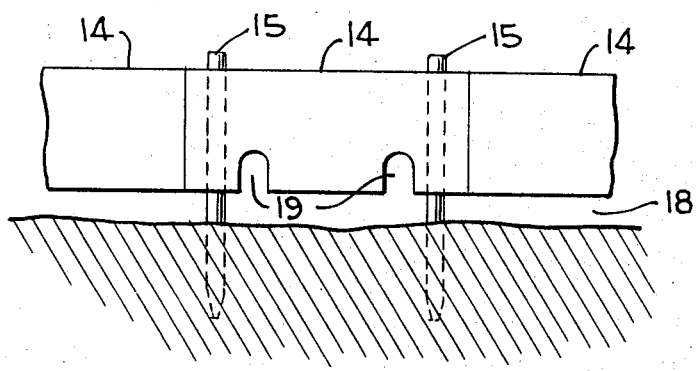

LITTORAL FLOW TRAP OR BASIN

This invention relates generally to a trap or basin for building up beaches and more particularly to such a trap as including interconnecting inshore and offshore bulkheads open to the littoral flow direction.

Recognizing that the ongoing tide and flow of our oceans and rivers are particularly responsible for the deterioration of beaches and river banks, it would be beneficial to reverse this situation and make use of this vast power of the sea and rivers so as to build up a shoreline of any given area. Tremendous amounts of soil are carried away from our beaches each week by our large bodies of water so that, by trapping the sand or soil held in suspension and by controlling the flow and impact pressure on the banks and beaches sufficiently to catch the sand and soil while in suspension on its downward or outward flow, our beaches can not only be preserved, but can be built up and made clearer for any variety of uses. Littoral flow, or that flow of water on or near a shore, is responsible for consistently gnawing at the shorelines and banks so that the soil, clay, silt, sand, and even shells are carried down-stream with the outgoing tide.

Littoral flow is responsible for carrying away small particles of soil or silt in suspension by the moving waves, lakes, rivers, bays, etc. as these minute particles are eroded away from the soil banks bordering on the waterways. When the water is retarded or stops flowing, it diverts itself of these soil particles. If these particles were to be dropped in an enclosure, a wide beach area would be eventually built up while at the same time preventing the erosion of existing beaches and even the cleansing of usable beach fronts.

A principal object of the present invention is therefore to provide a flow trap or basin to achieve this end.

Another object is to provide such a trap or basin as including interconnecting inshore and offshore bulkheads open to the littoral flow direction for trapping gravel, material and the like suspended in the water.

Another object of this invention is to provide such a trap or basin wherein the bulkheads comprise a plurality of plate sections secured end-to-end to a plurality of pilings supported in the ground, the lower ends of the inshore plate sections being embedded below the ground level and the lower ends of the offshore plate sections extending to the top of the ground level to permit scouring therebeneath for allowing the water to recede after dropping the suspended particles within the basin.

Other objects, advantages and novel features of the invention will become more apparent from the following description of the invention when considered in conjunction with the accompanying drawings wherein:

FIG. 5 is a typical sectional view of the flow basin taken along the line 5—5 of FIG. 2; and FIG. 6 is a typical elevational view of a part of the offshore bulkhead plates.

Figure 1:
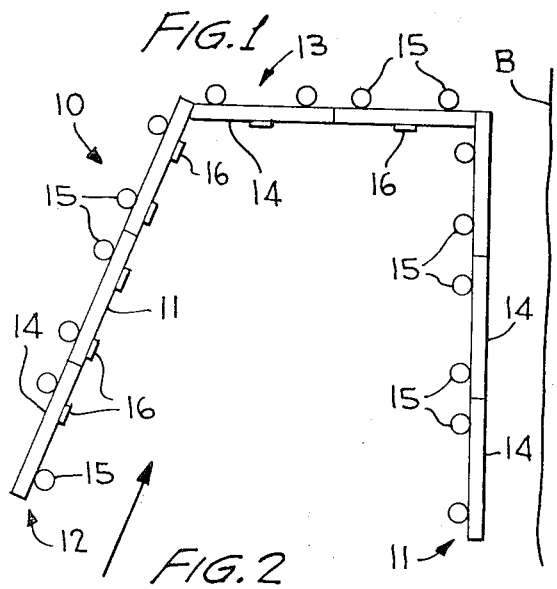
FIGS. 1, 2 and 3 are, respectively, top plan views schematically showing different variations of interconnected inshore and offshore bulkheads.

Turning now to the drawings where like reference characters refer to like and corresponding parts throughout the several views, there is shown a trap or basin generally designated 10 in FIG. 1 as comprising an inshore bulkhead 11 located generally parallel to the bank B of a shoreline, and further including an offshore bulkhead 12 located approximately 40 ft. offshore at an acute angle with respect to the inshore bulkhead. A transverse bulkhead 13 interconnects with the downstream ends of the inshore and offshore bulkheads while the upstream ends thereof are open to the littoral flow direction, as shown by the arrow, for trapping gravel material and the like within the bulkheads. Each of these bulkheads is constructed of a plurality of plate sections 14, which may be plates salvaged from scrapped waterborne vessels, secured end-to-end to a plurality of pilings 15 embedded in the ground as shown in FIG. 5. The plate sections of the offshore and transverse bulkheads may be strengthened by means of vertical stiffeners 16. The inshore bulkhead 11 is shown in FIG. 5 and is located on the beach near the bank B so as to not only prevent erosion through littoral flow from further removing soil or sand from the base of the bank as at 17, but to effect a buildup of the inshore beach toward the center between the inshore and offshore bulkheads as will be later explained. The main source of buildup material in the basin constituted by the interconnected bulkheads for restoring an eroded beach is carried in suspension by the outgoing tide, called "littoral flow." When this flow is slowed temporarily to a stop, the sediment is dropped in the basin enclosure. With a north shore installation, the littoral flow would run from north to south. The plate sections of the offshore bulkheads, which are more narrow in height as compared to the plate sections of the inshore bulkhead, serve to break up the impact of the incoming wave, permitting it to come over the top of the plate in a more or less spray form which contributes in part to sediment on the beach which builds up. It is important that the force of the wave be lessened so as not to roll in-shore and flow away at the base of the shore bank as at 17, eventually causing a bank slide. Also, beach debris is generally carried to the beach by the waves directed substantially perpendicular to the shoreline. Littoral flow, on the other hand, runs somewhat parallel to the shoreline and, by reason of the offshore bulkhead, this debris is substantially prevented from entering the basin.

The down river or ocean littoral flow water entering basin 10 requires runoff facilities. Such is accomplished by means of the offshore baffle plates 14 which are installed with their lower ends substantially at the top of ground level as shown in FIG. 5. Normally, such an installation presents the problem of scouring as shown at 18 (see also FIG. 6). With the present invention, however, this scouring is beneficial. It serves to facilitate runoff as well as to withhold useful sediment within the basin. The runoff can be controlled by restricting the scouring openings to suit local conditions and to insure that the soil remains within the basin compound. The incoming water carrying the suspended particles, deposits, a large amount of permanent slit, into the enclosed basin.

The inshore bulkhead 11 extends parallel to the bank B at a distance of approximately 5 to 8 ft. therefrom. This avoids the pressure and clawing effect of the water against the base of the bank as with an exceptionally high tide, windstorm, etc., since the inshore bulkhead prevents the waves from reaching the area of the bank.

The arrangement in accordance with the present invention combines several purposes. The inshore bulkhead 11 protects the bank against erosion by the undertow of waves and the off-shore bulkhead 12 serves not only as a water breaker for the waves but as one side of an enclosure for trapping the particles in suspension within the basin. As explained earlier, plates 14 of the offshore bulkhead 12 extend with their lower edges at substantially the top of the ground surface so as to permit a scouring of the soil therebeneath. This scouring is intentional as designed, so as to free the water of sediment during its outgoing movement. The eroded beach may, therefore, be built up and maintained as such by the littoral flow which is stopped sufficiently after it drops the sediment in the enclosed area. The offshore bulkhead also reduces the wave pressure against the inshore bulkhead 11. When littoral flow is slowed down momentarily to a stop by the plates of the offshore bulkhead 12, the particles held in suspension are dropped and the plates of the bulkhead permit the water to pass out with restriction thereunder by scouring. At various locations openings 19 may be provided in the plates 14 of the offshore bulkhead, as in FIG. 6, to control the outward flow of the water thereunder, minus the suspended particles.

Scouring beneath the offshore bulkhead plates can be regulated by means of rock or silt if necessary. The plates of the offshore bulkhead trap a considerable amount of water during an outgoing tide after the suspended particles have been dropped. In order to provide space for more silt bearing water, the arrangement of these plates in their relation to the ground surface permits scouring to effect the most desirable method of escape.

Salvaged plates may be used for each of the bulkheads although new steel plates may also be installed but at a much higher cost. The end results viewed for an existing arrangement in accordance with the present invention has greatly exceeded expectations. A clean, sandy beach, building up with each tide, with the assurance that continued erosion of the bank will not take place, is made possible with the present invention.

Maintenance is required about twice annually in inspecting the securing means for the plates for each of the bulkheads. The inshore bulkhead may be painted with a base coat of rust-resistant mix covered by green paint to blend with the landscape, and the bulkhead plate may be secured to their pilings in any normal manner, as by rivets, bolts, or welding.

Some spot welding was performed on the inshore bulkhead at the base of the steep bank B. This was an additional security measure to guard against damage to locations with a large overhang of earth, threatening an earth slide. Slides in the past have been absorbed by the tides; now they build up behind the bulkhead 11 to slope the bank. Also, rubble has been placed behind the inshore bulkhead to prevent loss of soil during a storm. White pine trees may be planted on the slope of the bank and, due to their spreading root base, further act to prevent bank slides.

Figure 2:
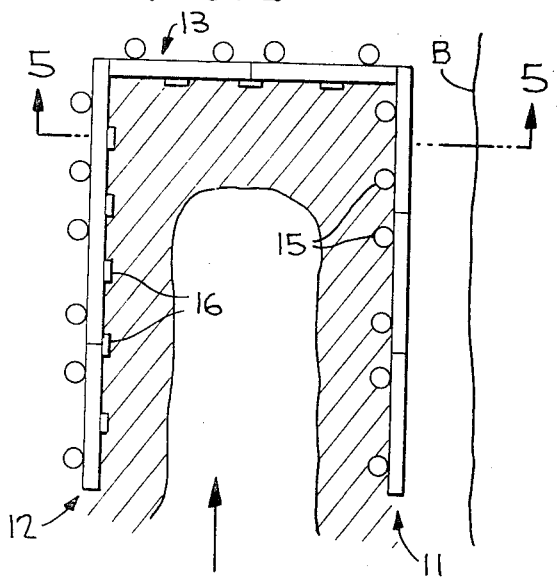
Figure 3:
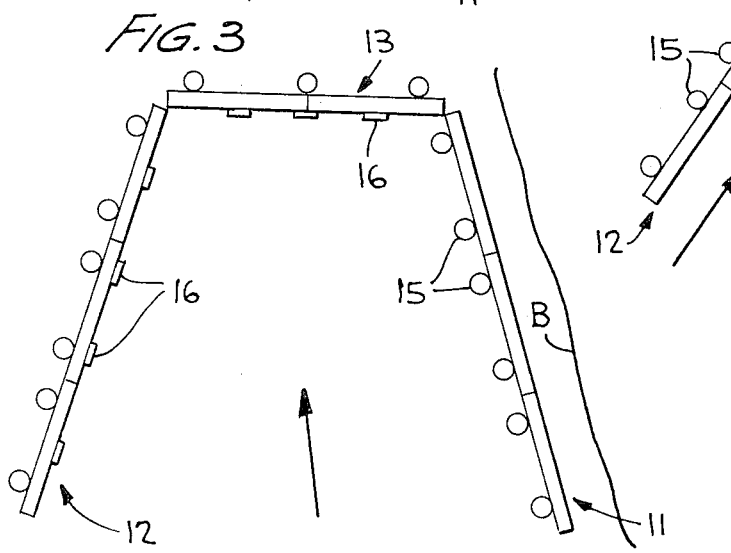
Figure 4:
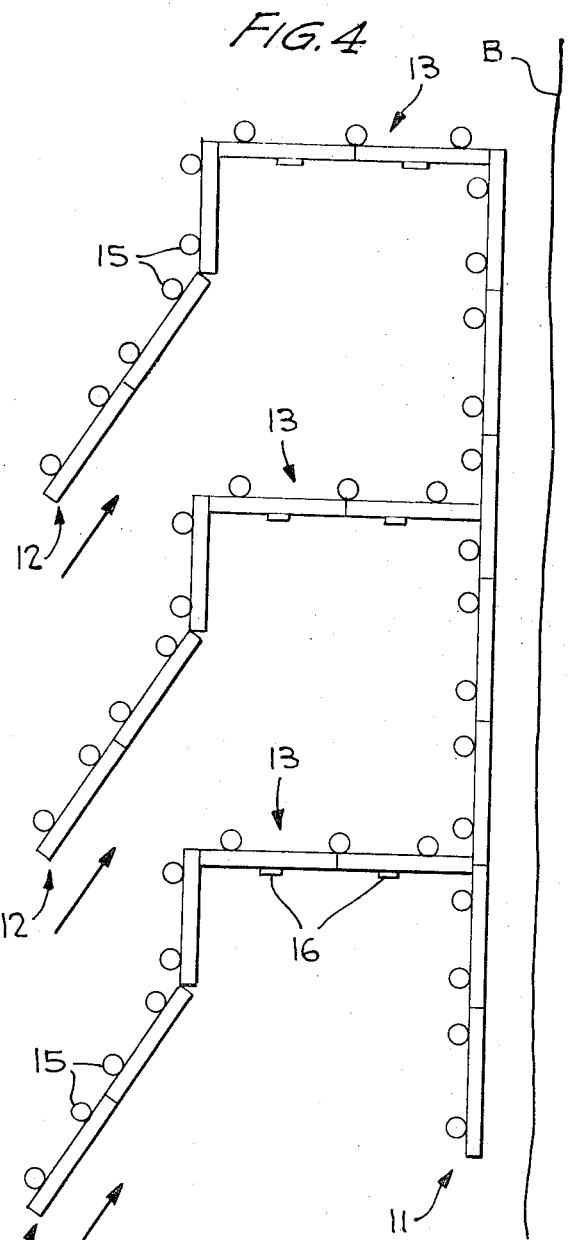
FIG. 4 is a top plan view similar to FIG. 1 except that a plurality of enclosures or basins are provided.

In FIG. 2, 3 and 4, different embodiments of the present invention are shown wherein the various bulkheads 11, 12 and 13 are constructed of plates 14 secured end-to-end to pilings 15 and reinforced by stiffeners 16 in precisely the same manner as described with reference to FIG. 1. In FIG. 2, inshore bulkhead 11 is arranged substantially parallel to bank B and offshore bulkhead 12 is likewise parallel to the bank or shoreline. In FIG. 3, the downstream ends of bulkheads 11 and 12 are spaced a greater distance apart as compared to their upstream ends connected by transverse bulkhead 13 and, in FIG. 4, a plurality of enclosures or basins are arranged for adjoining properties along a bank or shoreline so that, for example, transverse bulkhead 13 is located substantially at the dividing property line. Again, the bulkheads are constructed with plates and pilings similar to that described for FIG. 1.

From the foregoing, it can be seen that an inexpensive yet highly effective technique for building up of eroded beaches and for maintaining the built-up beach has been provided in an efficient manner. Cost of labor has been reduced to a minimum and, because of the availability of salvaged plates for the bulkheads, cost of construction has been further reduced. the littoral flow trap or basin of the present invention protects against further disappearance of riparian rights and permits the beach front property owner to extend his property further out into more shallow waters while at the same time, avoiding further loss over the years by erosion. The water banks are protected against deterioration exposed to wave action, and accumulation of debris and driftwood which normally clutters up an otherwise clean and sandy beach is effectively avoided. The built-up beach may be used as an offshore island for a lighthouse, a bridge pier, boat passengers, offshore loading for commercial barges, etc. The built-up beach made possible by the present invention can be used to partially enclose offshore areas surrounding a factory or plant that pollutes the waterways such as during an oil spill from moored tankers. Also, offshore marshlands or shoal areas may be effectively built up and the improved beach condition provides a less costly area for garbage collection in shallow water areas.

Obviously, many modifications and variations are made possible in the light of the above teachings. It is, therefore, to be understood that within the scope of the appended claims, the invention may be practiced otherwise than as specifically described.

What is claimed is:

1. A littoral flow trap or basin for effecting the build-up of a beach and for preventing future deterioration thereof, comprising an elongated inshore bulkhead extending substantially parallel to the shoreline, said bulkhead comprising a plurality of vertical plate sections secured end-to-end to a plurality of pilings supported in the ground, the lower ends of said plate sections extending below the ground level, at least one elongated offshore bulkhead spaced from said inshore bulkhead, at least one transverse bulkhead interconnecting said inshore and offshore bulkheads only at their downstream ends thereby defining a basin enclosure, said offshore and transverse bulkheads each comprising a plurality of vertical plate sections secured end-to-end to a plurality of pilings supported in the ground, the lower ends of said offshore and transverse bulkhead plate sections extending only to the top surface of the ground, whereby sediment material and the like carried in suspension by the outgoing tide is slowed temporarily to a stop by said offshore and transverse bulkheads and is dropped in said basin enclosure, water runoff during its outgoing movement from within said enclosure effecting a scouring action beneath said offshore and transverse bulkhead plates, such scouring action serving to free the water of sediment and causing it to build up inwardly of said plates.

2. The littoral flow trap according to claim 1 wherein said offshore bulkhead lies parallel to said inshore bulkhead.

3. The littoral flow trap according to claim 1 wherein said offshore bulkhead lies at an acute angle to said inshore bulkhead with said upstream ends of said inshore and offshore bulkheads being further spaced apart relative to spacing of said inshore and offshore downstream ends.

4. The littoral flow trap according to claim 1 wherein a plurality of said offshore bulkheads are provided, each being interconnected with said inshore bulkhead by a respective one of a plurality of transverse bulkheads.

5. The littoral flow trap according to claim 1 wherein said plate sections of said offshore and transverse bulkheads are provided with openings along said lower ends to control the outward flow of water during its outgoing movement from within said enclosure.

* * * * *